United States Patent
Grobe

(10) Patent No.: US 8,600,240 B2
(45) Date of Patent: Dec. 3, 2013

(54) OPTICAL NETWORK ELEMENT, OPTICAL NETWORK, AND METHOD OF OPERATING AN OPTICAL NETWORK

(75) Inventor: Klaus Grobe, Utting (DE)

(73) Assignee: ADVA AG Optical Networking (DE)

( * ) Notice: Subject to any disclaimer, the term of this patent is extended or adjusted under 35 U.S.C. 154(b) by 462 days.

(21) Appl. No.: 12/874,985

(22) Filed: Sep. 2, 2010

(65) Prior Publication Data

US 2011/0064409 A1    Mar. 17, 2011

(30) Foreign Application Priority Data

Sep. 17, 2009   (EP) ...................................... 09011836

(51) Int. Cl.
*H04J 14/02*   (2006.01)
(52) U.S. Cl.
CPC ..................... *H04J 14/02* (2013.01)
USPC ........................................................ 398/157
(58) Field of Classification Search
USPC .......................................... 398/157, 173–181
See application file for complete search history.

(56) References Cited

U.S. PATENT DOCUMENTS

| | | | | |
|---|---|---|---|---|
| 7,483,639 B2* | 1/2009 | Hoshida et al. | ............... | 398/180 |
| 2004/0208586 A1* | 10/2004 | Kinoshita | ....................... | 398/92 |

FOREIGN PATENT DOCUMENTS

| | | |
|---|---|---|
| EP | 0763908 A1 | 3/1997 |
| EP | 0865173 A2 | 9/1998 |
| EP | 1519502 A1 | 3/2005 |
| EP | 1679809 A2 | 7/2006 |

* cited by examiner

*Primary Examiner* — Danny Leung
(74) *Attorney, Agent, or Firm* — Donald R. Boys; Central Coast Patent Agency, Inc.

(57) ABSTRACT

The invention relates to an optical network element (100; 300'), particularly optical line terminal, OLT, or remote node, RN, for transmitting and/or receiving data via an optical network (200) that comprises at least one optical fiber link (210), wherein said optical network element (100; 300') has a primary optical interface (110; 310) configured to be connected with said optical fiber link (210) to transmit and/or receive data to/from said optical network (200).

Figure 1:
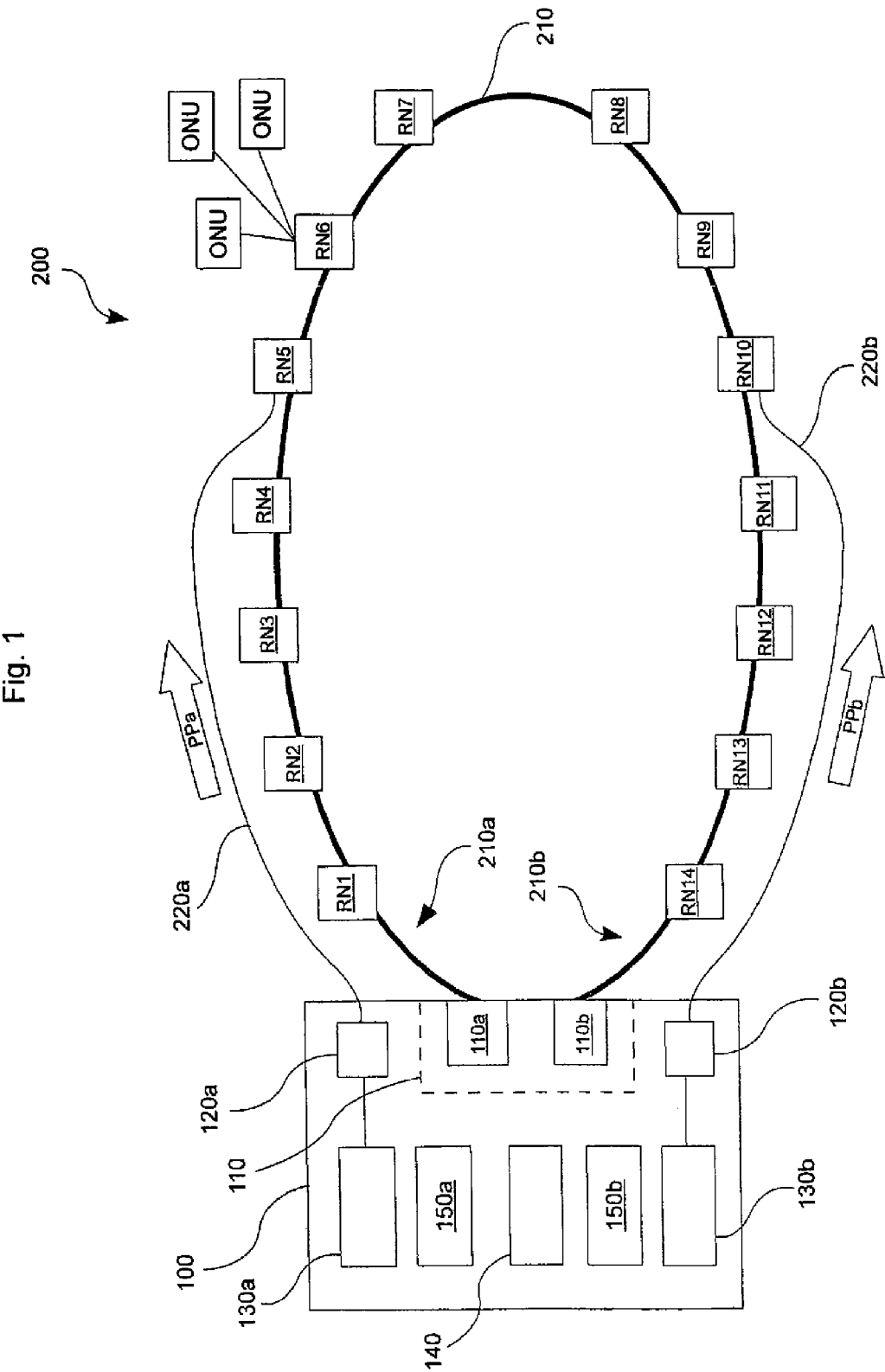

The inventive optical network element (100) is characterized by at least one secondary optical interface (120*a*, 120*b*; 320*a*, 320*b*) configured to provide optical pump power (PPa, PPb) to at least one further network element (RN5, RN10; RNa, RNr) via a further optical fiber link (220*a*, 220*b*; 220*g*, 220*h*), preferably a dedicated pump fiber link, thus enabling true scalability of the optical network (200) regarding network size, particularly link length and the number of remote nodes.

14 Claims, 5 Drawing Sheets

OPTICAL NETWORK ELEMENT, OPTICAL NETWORK, AND METHOD OF OPERATING AN OPTICAL NETWORK

The present application claims priority to European patent application serial number 09 011 836.5-2415, which was filed on Sep. 17, 2009, which is incorporated herein in its entirety, at least by reference.

The invention relates to an optical network element, particularly optical line terminal, OLT, or remote node, RN, for transmitting and/or receiving data via an optical network that comprises at least one optical fiber link, wherein said optical network element has a primary optical interface configured to be connected with said optical fiber link to transmit and/or receive data to/from said optical network.

The invention further relates to an optical network and a method of operating an optical network.

Optical network elements, optical networks and corresponding operating methods of the aforementioned type are generally known from conventional WDM-PON network implementations, where data is transmitted via a basically passive optical network, PON, employing wavelength division multiplex techniques for increasing the transmission bandwidth that is available per optical fiber link.

PONs are currently used in the field of access/distribution networks in order to connect a plurality of customer devices, commonly referred to as optical network units, ONUs, with a central office of said optical network. The only active network element usually comprised within such systems is represented by an optical line termination, OLT, which is located at a central office portion of said network. In the context of the present invention, the term "active" denotes the ability of a network element to generate, i.e. provide, optical pump power for optical pumping of optical amplifiers such as Erbium doped fiber amplifiers, EDFA, or Raman amplifiers.

A major disadvantage of the known systems is the fact that provisioning of optical pump power for remote pumping of network elements of said optical network is strictly limited by the maximum optical power that may be coupled into the network at the OLT's location. Thus, the effective coverage for supplying remote nodes of an optical network with pump power is limited to only a few remote nodes directly neighboring, i.e. upstream or downstream, the OLT. Other remote nodes, which are not located close to the OLT, cannot efficiently be supplied with optical pump power, which effectively limits the expandability of the network.

Thus, it is an object of the present invention to improve a network element, an optical network and a method of operating an optical network of the aforementioned type in order to enable scalability of the optical network regarding network size, particularly link length, and the overall number of remote nodes.

According to the present invention, regarding the above-mentioned network element, this object is achieved by providing at least one secondary optical interface configured to provide optical pump power to at least one further network element via a further optical fiber link, preferably a dedicated pump fiber link.

The inventive secondary optical interface enables to provide optical pump power to remote network nodes without requiring to couple said optical pump power directly into the optical fiber link connected to said primary optical interface, thus avoiding the problems experienced with prior art systems. Particularly, the inventive network element does not rely on the primary optical interface for transmitting optical pump power to remote nodes at all, because the optical pump power is provided via the inventive secondary optical interface.

According to a preferred embodiment, the further optical fiber link is a dedicated pump fiber link, which maximizes the pump power that can be transmitted to remote nodes via said secondary optical interface.

A further preferred embodiment of the present invention proposes to provide at least one pump light source configured to supply said secondary optical interface with optical pump power. Said pump light source, which may e.g. be a conventional pump laser, is preferably co-located with said inventive network element. More preferably, said pump light source is directly integrated to the inventive network element.

According to a further advantageous embodiment of the present invention, the network element may also comprise at least one pump light source configured to supply said primary optical interface with optical pump power, which enables to employ both the primary optical interface and the secondary optical interface for transmitting optical pump power.

Since the primary optical interface is also used for transmitting data, in addition to optical pump power, said primary optical interface usually cannot transmit the same amount of optical pump power as the inventive secondary optical interface. Nevertheless, a combined usage of both interfaces for optical pumping advantageously maximizes the optical pump power that can be coupled into the network at the network element's location.

According to a further advantageous embodiment of the present invention, said pump light sources are configured to supply optical pump power having a plurality of different wavelengths thus enabling to multiplex optical pump power. It is also possible to selectively, i.e. under control of the inventive network element, transmit pump power of different wavelengths to remote nodes. If the so pumped remote nodes are equipped with corresponding filter means to filter specific pump wavelengths, there is a further degree of freedom to implement the optical pumping of said remote nodes.

A particularly advantageous embodiment of the present invention is characterized in that said primary optical interface comprises a first port for coupling the optical network element to a first segment of said optical fiber link and a second port for coupling the optical network element to a second segment of said optical fiber link. This configuration enables to e.g. operate an optical network having ring topology.

In accordance with a further embodiment, the inventive network element may be configured to determine whether data to be transmitted to said optical network is to be transmitted via said first port or via said second port, thus enabling to provide a 1:1 group protection scheme for downstream data transmissions originating from the inventive network element. Based on a ring topology of the optical network, both segments of which are connected to the inventive network element, a control unit of said network element may monitor any upstream transmissions from remote nodes to the network element. Upon detecting a loss of light (LoL) condition of a specific segment, i.e. the absence of optical transmission power incident to one of the network element's ports associated with said specific segment, the control unit may conclude that there is an error condition such as a broken fiber within said segment. In response to such error condition, the control unit may choose the respective port of its primary optical interface to use for future downstream data transmissions to avoid transmitting data via said possibly broken fiber or ring segment, respectively.

Likewise, if the network comprises remote nodes that are configured to transmit upstream data to said network element via both segments of the ring topology in order to provide a 1+1 group protection scheme for upstream transmissions, the network element may chose one of its ports for receiving said upstream data to avoid a redundant processing of both segment's upstream data.

Correspondingly, according to a further advantageous embodiment, the inventive network element comprises control means configured to selectively couple at least one of said ports of said primary optical interface with receiving means or transmitting means. The control means may e.g. be implemented in the form of a microcontroller, a digital signal processor (DSP), a field programmable gate array (FPGA) or an ASIC (application specific integrated circuit) or a combination thereof.

According to a further advantageous embodiment, the inventive network element is characterized in that said secondary optical interface is configured to receive optical pump power from said further optical fiber link and to couple said received optical pump power to said optical fiber link, which advantageously enables the inventive network element to utilize pump power that has been provided by a remote node in the inventive way, i.e. via separate and preferably dedicated pump fiber links.

The inventive network element or a remote node, which is also configured in accordance with the present invention, may e.g. comprise an integrated EDFA or another optical amplifier that can use optical pump power for amplification of transmitted signals, e.g. a Raman amplifier. The optical amplifier may be integrated in that part of a fiber span of the optical fiber link which is connected to said network element via its primary optical interface.

The network element's secondary optical interface may comprise a coupler that can receive the pump power from said further optical fiber link and that is configured to couple the received pump power to the optical fiber link transmitting payload data.

This configuration enables a direct and efficient supply of optical pump power to remote nodes or network elements. Particularly, in contrast to prior art systems, where pump power is only injected into the primary, i.e. payload fiber, link at the OLT, the inventive provisioning enables to supply arbitrary remote nodes/network elements with pump power while avoiding input power restrictions as mentioned above. For this purpose, one or more further optical fiber links may be provided between the network element comprising pump sources and the arbitrary remote nodes/network elements which are to be pumped.

The inventive technique, which is enabled by employing at least one further optical fiber link for primarily or exclusively transmitting pump power, advantageously enables to selective inject pump power into remote nodes and the primary, i.e. payload carrying, optical fiber link at such locations where direct pumping is actually necessary.

Thus, "overpumping" the payload fiber link at an OLT's location can advantageously be avoided, and yet, remote nodes of the network, that are located comparatively far away from the pumping OLT, may also be adequately pumped thus giving the possibility to scale the whole optical network.

As long as a sufficient number of further optical fiber links for pumping are provided, the optical network may be expanded by adding further remote nodes or increasing a span width between adjacent remote nodes on the ring topology.

An optical network according to the present invention comprises at least one optical fiber link and at least one inventive network element as disclosed above.

According to a particularly advantageous embodiment of the present invention, an optical network is proposed, wherein said optical fiber link forms a ring topology, wherein a first segment of said optical fiber link is coupled to a first port of said primary optical interface of said network element, wherein a second segment of said optical fiber link is coupled to a second port of said primary optical interface of said network element, wherein said optical network comprises a plurality of remote nodes coupled to said optical fiber link between said first and second ports. The inventive optical network is characterized by at least one further optical fiber link that connects said secondary optical interface of said network element with at least one of said remote nodes for transmitting optical pump power from said network element to said remote node.

A particularly homogenous provisioning of optical pump power to the optical fiber link and its network elements or remote nodes, respectively, is possible if said at least one further optical fiber link directly connects said secondary optical interface of said network element with the n-th remote node of said ring topology downstream and/or upstream of said network element, wherein n is equal to or greater than 2, preferably equal to or greater than 4. This configuration advantageously enables to provide every n-th remote node of the network ring and its direct neighbors with "fresh" optical pump power. Depending on the actual pump power requirements of the involved remote nodes, the coupling locations where said further optical fiber links are coupled to said payload fiber link can be chosen differently.

A further advantage of the inventive principle is the possibility to homogenously inject pump power at arbitrary locations into the payload fiber link in both transmission directions, i.e. upstream and downstream as seen from a specific remote node. For this purpose, respective couplers have to be provided within the specific remote node. This inventive measure advantageously increases the resilience of the inventive network with respect to the provisioning of pump power. I.e., upon failure of a single optical fiber, due to the homogenous distribution and injection of pump power to the ring topology, it is still possible to properly operate large parts of the ring topology, i.e. the provisioning of pump power is only slightly affected by single errors on the optical network.

According to a further advantageous embodiment of the present invention, said optical fiber link comprises a single optical fiber for transmitting data, i.e. payload data, whereby a per se known single fiber working, SFW, concept is realized.

Further optical fibers which may be implemented in a fiber optic cable used to establish the ring topology may advantageously be used to transmit pump power in the inventive manner.

A particularly preferred embodiment of the inventive optical network is characterized in that two inventive network elements, which are preferably configured as optical line termination, OLT, are connected to said optical fiber link. Thereby, a dual homing principle is realized that further improves robustness of the inventive optical network. For example, by employing appropriate signaling between said two inventive OLTs—which is not subject of the present invention and thus not further detailed—, a first OLT may operate and control the network, and upon a failure of said first OLT, the second OLT may take over operation and control of the network. I.e., in this case, the second OLT represents a backup device.

It is also possible to operate both inventive OLTs in parallel, e.g. with different wavelength ranges for data transmission or the like.

As a further solution to the present invention, a method according to claim 14 is proposed. The inventive method comprises a step of transmitting optical pump power directly from said network element to said remote node by means of at least one further optical fiber link that connects said secondary optical interface of said network element with at least one of said remote nodes.

Preferably, optical pump power is transmitted directly from said network element to a plurality of said remote nodes via respective further optical fiber links, wherein said optical pump power transmitted via said further optical fiber links is preferably coupled into said optical fiber link at every n-th remote node, wherein n is equal to or greater than 2, preferably equal to or greater than 4, whereby a particularly homogenous distribution of pump power is achieved.

Figure 2:
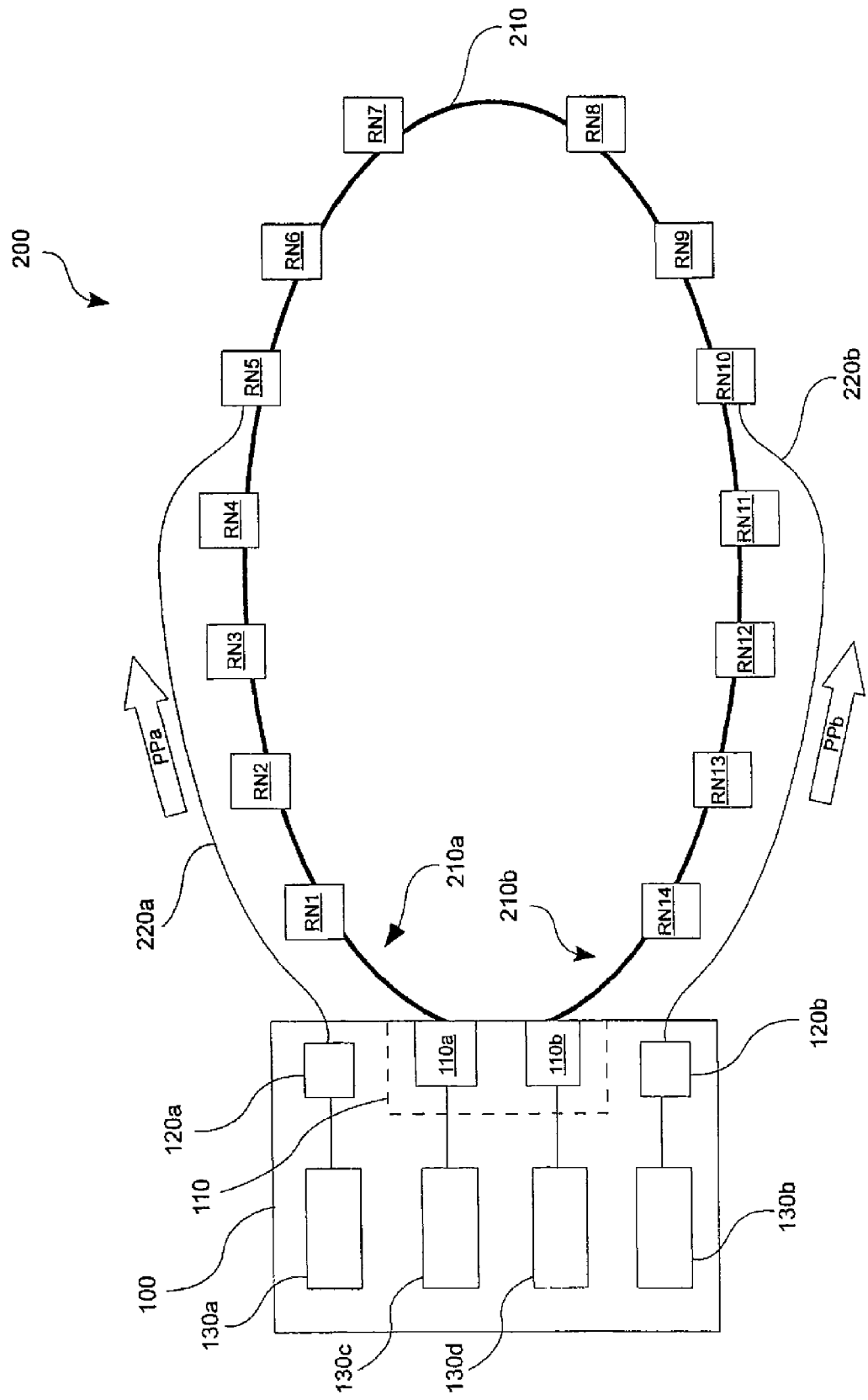
Figure 3:
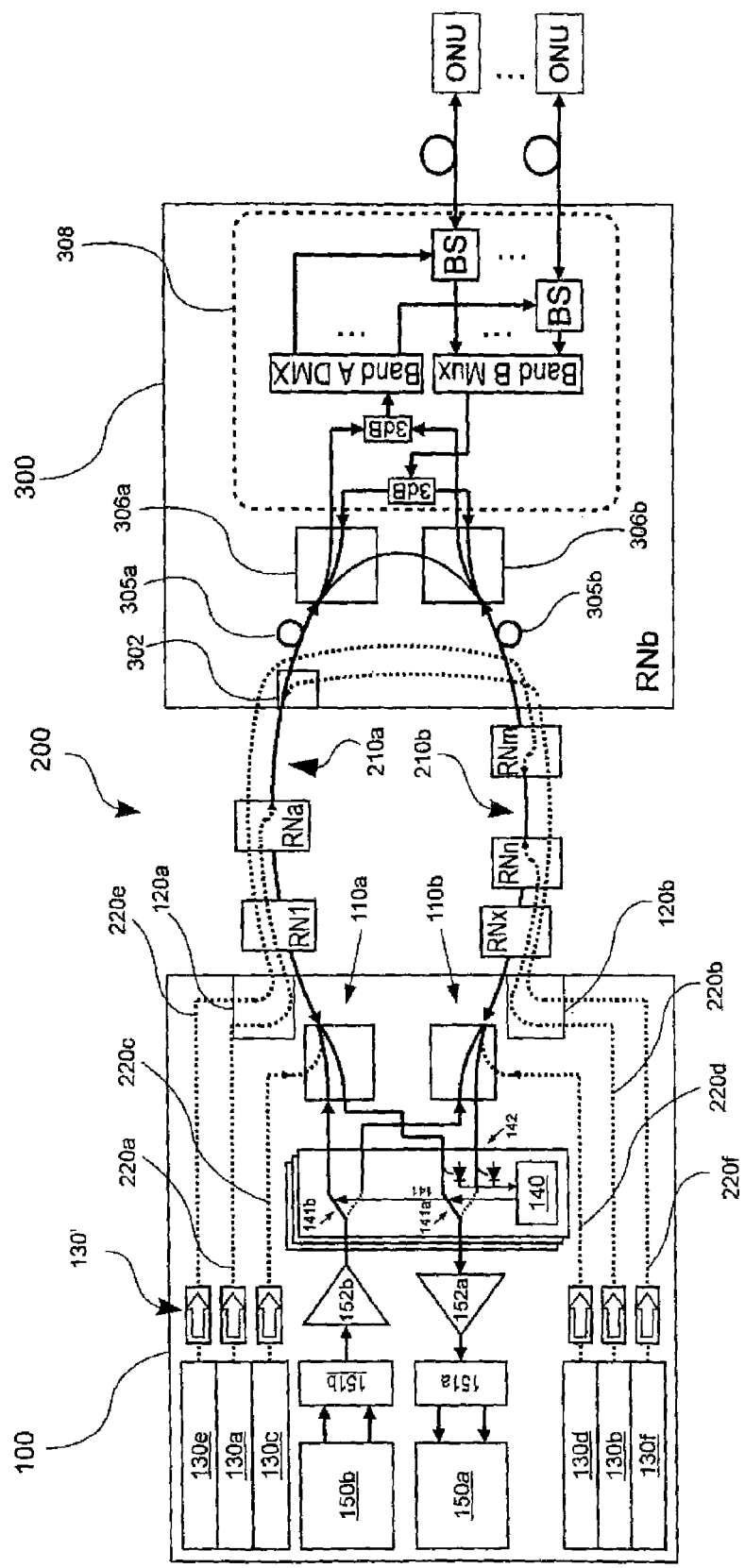
Figure 4:
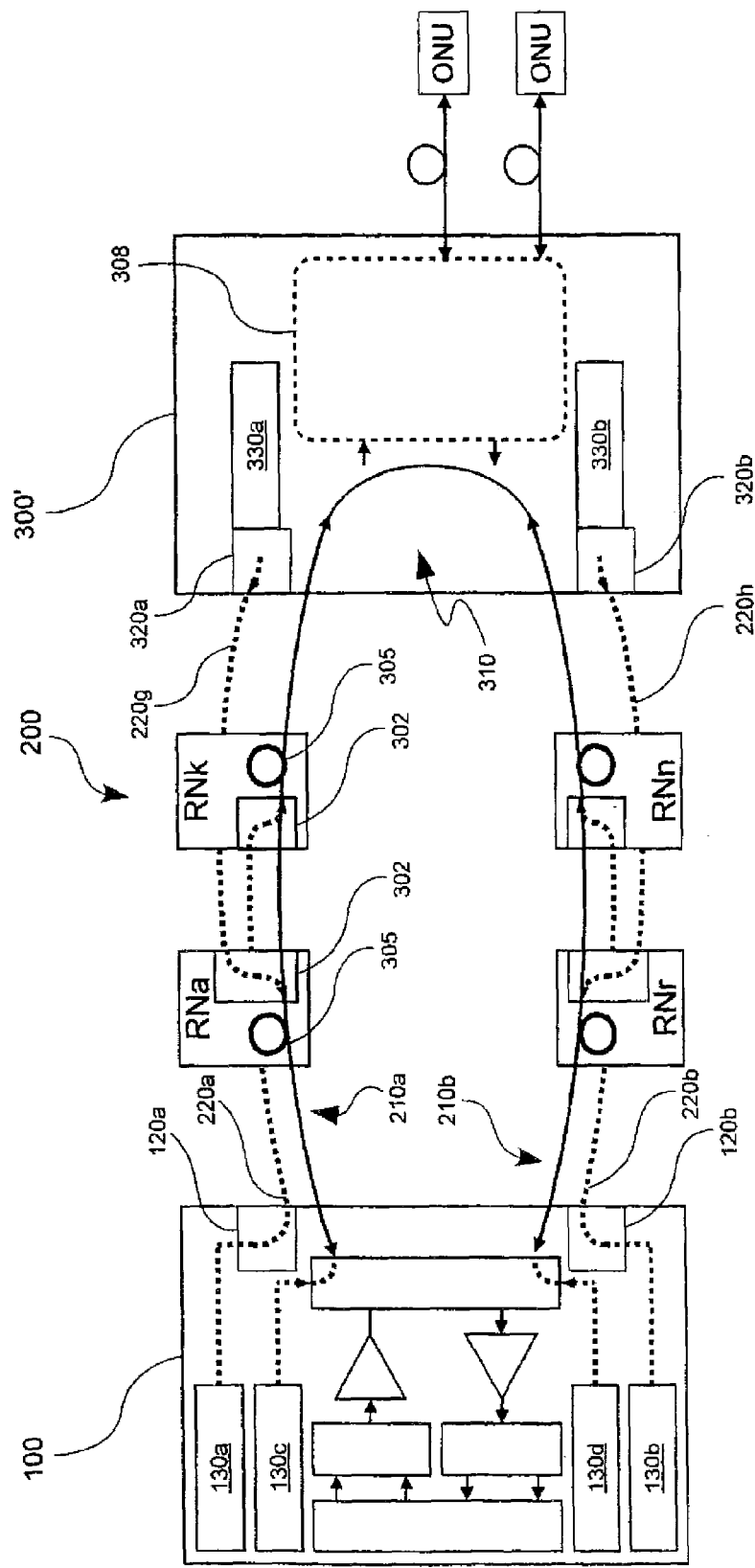
Figure 5C:
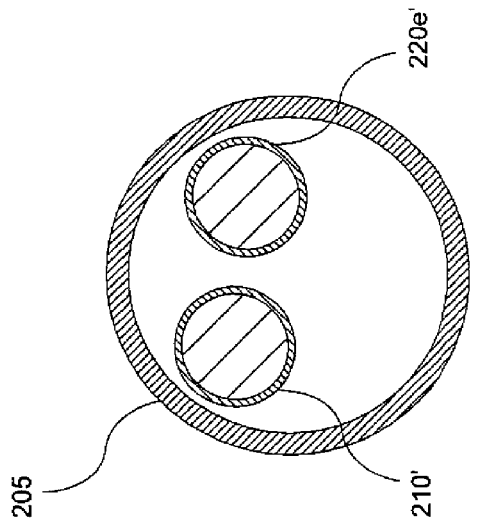
Figure 5B:
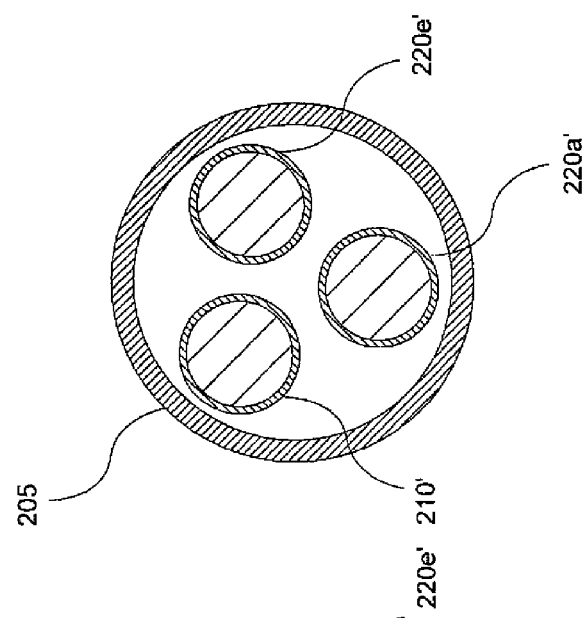
Figure 5A:
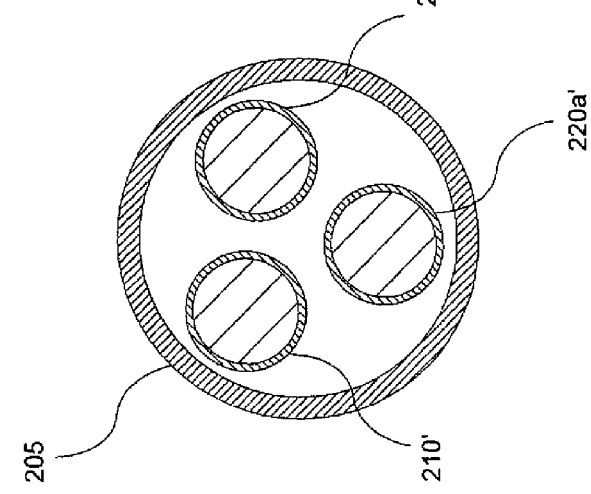

Further features, aspects and advantages of the present invention are presented in the following detailed description with reference to the drawings in which:

FIG. 1 depicts a schematic block diagram of a first embodiment of the inventive network element, FIG. 2 depicts a schematic block diagram of a second embodiment of the inventive network element, FIG. 3 depicts a schematic block diagram of a third embodiment of the inventive network element, FIG. 4 depicts a schematic block diagram of a fourth embodiment of the inventive network element, and FIGS. 5a, 5b, 5c schematically depict a respective cross-section of a fiber optic cable of the inventive optical network at different locations in the network's ring topology.

FIG. 1 depicts a schematic block diagram of a first embodiment of the inventive network element 100 which is presently configured to comprise typical functionality of an optical line terminal, OLT.

The OLT 100 is part of an optical network 200, which comprises an optical fiber link 210 arranged in a per se known ring topology as depicted by FIG. 1.

Due to the ring topology, a first segment 210a of said optical ring 210 is connected to a first port 110a of the OLT 100. Likewise, a second segment 210b of said optical ring 210 is connected to a second port 110b of the OLT 100. Both ports 110a, 110b are part of a primary optical interface 110 that is configured to be connected with said optical fiber link 210 in order to transmit and/or receive data to/from said optical network 200.

The optical network 200 comprises various remote nodes RN1, . . . , RN14, which are connected to the optical ring 210. Although the remote nodes RN1, . . . , RN14 may also comprise OLT functionality and may thus be similar or identical to OLT 100 regarding structure and function, in a preferred embodiment of a passive optical network, PON, the remote nodes RN1, . . . , RN14 are basically passive devices in that they are not configured to generate, i.e. provide, optical pump power for optical pumping of optical amplifiers such as Erbium doped fiber amplifiers, EDFA, or Raman amplifiers.

The passive remote nodes RN1, . . . , RN14 may e.g. serve to form an optical access or distribution network on a PON basis, wherein e.g. wavelength multiplexing, WDM, techniques may be used for data transmission over the optical ring 210 as well as to further network elements. Such a configuration is also referred to as WDM-PON.

For example, a plurality of ONUs, optical network units, may be coupled to each remote node, RN1, . . . , RN14, said ONU usually being located at customers' premises, whereas the OLT 100 is typically located at a central office of said network 200. The connection scheme of ONUs to a remote node RN6 may e.g. comprise the exemplary star topology depicted by FIG. 1. Further topologies such as ring topologies may also be provided to couple the ONUS to specific remote nodes RN1, . . . , RN14.

According to the present invention, said OLT 100 comprises at least one secondary optical interface configured to provide optical pump power to at least one further network element of said optical network 200 via a further optical fiber link. This additional optical interface advantageously enables to directly and efficiently supply remote nodes, which are located comparatively far away from said OLT 100, with optical pump power.

According to the present embodiment, the inventive secondary optical interface is realized by the two optical ports 120a, 120b, which are coupled to further optical fiber links 220a, 220b.

The first optical port 120a of the secondary optical interface is coupled to a pump light source 130a, which is advantageously integrated in said OLT 100 and which is configured to supply said port 120a with optical pump power.

Likewise, the second optical port 120b of the secondary optical interface is coupled to a pump light source 130b, which is also integrated in said OLT 100 and which is configured to supply said port 120b with optical pump power.

The optical pump power, which is symbolized by the block arrows PPa, PPb in FIG. 1, is transmitted via the inventive further optical fiber links 220a, 220b. Preferably, the inventive further optical fiber links 220a, 220b are dedicated pump fiber links, i.e. they are only employed for transmitting optical pump power.

The optical pump power PPa provided by the pump light source 130a is directly transmitted to the remote node RN5 via said dedicated pump fiber link 220a, and the optical pump power PPb provided by the pump light source 130b is directly transmitted to the remote node RN10 via said dedicated pump fiber link 220b.

The use of the inventive secondary optical interface 120a, 120b in combination with the dedicated pump fiber links 220a, 220b advantageously enables to provide pump power PPA, PPb from the OLT 100 directly to the remote nodes RN5, RN10. The remote nodes RN5, RN10 comprise couplers (not shown) which are configured to couple the received pump power PPa, PPb directly to the optical ring 210, which is mainly used for payload data transmission.

Thus, optical amplifiers such as EDFA and Raman amplifiers located at said remote nodes RN5, RN10 or at least in the neighborhood of said remote nodes RN5, RN10 may efficiently be provided with pump power PPa, PPb that can be used by the optical amplifiers to amplify data signals transmitted via said optical ring 210.

For instance, the pump power PPa injected to the optical ring 210 at the location of remote node RN5 may at least be utilized by optical amplifiers comprised in the neighborhood of the remote nodes RN5, RN6, RN7, RN8, whereas the pump power PPb injected to the optical ring 210 at the location of remote node RN10 may at least be utilized by optical amplifiers comprised in the neighborhood of the remote nodes RN10, RN9, RN8, RN7.

To achieve an optimally homogenous pump power supply throughout the whole optical ring 210, e.g. every n-th remote node RN5, RN10, . . . of the network may be supplied with pump power by means of the inventive structures, wherein n>=2 or preferably n>=4.

The inventive provisioning of pump power by the secondary optical interface and separate fiber links 220a, 220b advantageously enables to provide a fully scalable optical network 200.

Prior art optical networks, which only provide for coupling optical pump power directly to said optical ring 210 via said primary optical interface 110, i.e. at the OLT's location, suffer from the limitation of optical power that may be supplied to the optical ring 210. Particularly in the case of WDM-PONs, where a plurality of wavelengths is transmitted via said optical ring 210, only comparatively few pump power may be added to the optical ring 210 at the OLT 100. This limited amount of pump power is usually consumed by the remote nodes RN1, RN2, RN13, RN14 so that the further remote nodes RN3, . . . , RN12 are not supplied with pump power at all. Thus, prior art networks are limited to a very small number of remote nodes and comparatively short fiber spans of the optical ring.

In contrast to the prior art systems, the inventive provisioning of pump power by the secondary optical interface and separate fiber links 220a, 220b advantageously enables to also efficiently supply comparatively remote nodes RN3, . . . , RN12 with pump power so that a large number of remote nodes may be connected to the optical ring 210. Consequently, a comparatively high number of ONUs may be added to the inventive network 200 and comparatively long fiber spans may be provided between the remote nodes RN3, . . . , RN12.

For example, by employing the inventive principle, optical ring networks with a total ring length of about 100 kilometers and eight or more remote nodes can be provided.

As also depicted by FIG. 1, the inventive OLT 100 comprises control means 140 that are configured to selectively couple at least one of said ports 110a, 110b of said primary optical interface 110 with receiving means 150a or transmitting means 150b. Thus, the inventive OLT 100 can dynamically be configured to e.g. receive data from the first segment 210a of the optical ring 210 and to transmit data to downstream remote nodes via said second segment 210b of the optical ring 210.

This flexible configurability of the inventive OLT 100 enables to e.g. implement a 1:1 group protection scheme for downstream transmissions, according to which said OLT 100 may selectively transmit data to the remote nodes RN1, RN14 via said first segment 210a, i.e. in a clockwise direction, or via said second segment 210b, i.e. in a counter-clockwise direction, as seen from the optical ring 210.

The control means 140 may e.g. be implemented in the form of a microcontroller, a digital signal processor (DSP), a field programmable gate array (FPGA) or an ASIC (application specific integrated circuit) or a combination thereof.

FIG. 2 depicts a schematic block diagram of a second embodiment of the inventive OLT 100. In contrast to the OLT depicted by FIG. 1, the OLT 100 of FIG. 2 additionally comprises two further pump light sources 130c, 130d configured to provide pump power directly to the ports 110a, 110b of the primary optical interface 110. This measure advantageously enables to achieve a particularly homogenous pump power distribution in the optical ring 210, since the remote nodes RN1, . . . , RN4 and RN11, RN14 may thus efficiently be supplied with pump power.

The combination of the inventive pump power supply via the preferably dedicated fiber links 220a, 220b and the conventional ports 110a, 110b, which are mainly used for data transmission, yields a particularly useful arrangement.

The control means 140 and the components 150a, 150b are not shown in FIG. 2 for the sake of clarity.

FIG. 3 depicts a schematic block diagram of a third embodiment of the inventive OLT 100. In contrast to FIG. 2, only selected remote nodes RN1, RNa, RNb, RNm, RNn, RNx are explicitly depicted by FIG. 3, wherein further intermediate remote nodes may also be connected to the optical ring 210 but are presently not shown for reasons of clarity.

The OLT 100 comprises six pump light sources 130a, . . . , 130f, each of which is coupled to a corresponding pump fiber link 220a, . . . , 220f. Filter means 130' may be arranged at the respective outputs of the pump light sources 130a, . . . , 130f to prevent optical power from propagating into the pump light sources 130a, . . . , 130f.

The pump fiber links 220a, 220e and 220b, 220f are coupled to the respective pump light sources 130a, 130e, 130b, 130f via the inventive secondary optical interfaces 120a, 120b. The pump fiber links 220c, 220d provide a direct coupling of the pump light sources 130c, 130d to the ports 110a, 110b.

According to the configuration depicted by FIG. 3, the remote nodes RN1, RNa and their respective neighbors (not shown) are supplied with pump power by the pump light sources 130c, 130f. The remote nodes RNn, RNx and their respective neighbors (not shown) are supplied with pump power by the pump light sources 130d, 130e. The remote nodes RNb, RNm and their respective neighbors (not shown) are supplied with pump power by the pump light sources 130a, 130b. By this inventive configuration, a sophisticated pump protection scheme is achieved which improves the resilience of the whole optical network 200, because even if one or more pump light sources 130a, 130b, . . . fail, the optical network 200 is still supplied with pump light by means of the other pump light sources which are coupled to the optical network 200 separately.

FIG. 3 also depicts an inventive network element 300, which is presently configured as a passive remote node RNb, in detail.

The remote node RNb advantageously comprises a coupler 302 for coupling optical pump power supplied via said pump fiber link 220f to said optical ring 210, so that it can be employed by neighboring nodes RNa, . . . for optical amplification by means of an optical amplifier such as an EDFA.

For a WDM-PON configuration of network 200 which employs dense WDM (DWDM) transmission schemes, the coupler 302 may e.g. configured as a 1480 nanometer/DWDM coupler, i.e. a typical WDM coupler.

Other remote nodes RN1, RNa, . . . may also comprise a coupler 302 to perform the explained function.

Likewise, the remote node RNb itself comprises erbium doped fibers, EDF, 305a, 305b working as optical amplifiers. These integrated EDFAs 305a, 305b, in turn, may consume pump power that is coupled into the optical ring 210 e.g. by the remote node RNn. The optical pump power supplied to remote node RNn by said pump light source 130b and the pump fiber link 220b propagates through the optical ring 210 and upon arrival at the EDFAs of remote node RNb is consumed to amplify payload data transmitted via the optical ring 210.

Thus, the couplers 306a, 306b may be supplied with an amplified payload signal for further processing by the multiplexing unit 308.

The coupler 306a of remote node RNb is configured to directly forward pump power that is received from the first segment 210a of the optical ring 210 to the second segment 210b of the optical ring 210. I.e., ideally, any pump power that has been received from the first segment 210a by the remote node RNb and that has not been consumed by EDFA 305a, is forwarded to the second segment 210b and thus to neighboring remote nodes RNm. Consequently, the coupler 306a does not transmit received pump power to the multiplexing unit 308.

Likewise, the coupler 306b of remote node RNb is configured to directly forward pump power that is received from the second segment 210b of the optical ring 210 to the first segment 210a of the optical ring 210. I.e., ideally, any pump power that has been received from the second segment 210b by the remote node RNb and that has not been consumed by EDFA 305b, is forwarded to the first segment 210a and thus to neighboring remote nodes RNa. Consequently, the coupler 306b does not transmit received pump power to the multiplexing unit 308.

However, the couplers 306a, 306b are configured to extract from optical ring 210 and forward certain wavelength groups or further data related to the ONUs connected to said remote node RNb to the multiplexing unit 308 which combines such data by means of e.g. a 3 db-coupler. After this combining, the combined data is forwarded to the Band A demultiplexer which forwards respectively demultiplexed data to the associated ONUS.

Data transmitted from the ONUs to the remote node RNb is—after passing a band splitter BS—multiplexed by the Band B multiplexer and forwarded to a further 3 db-coupler of the multiplexing unit 308 which transmits the signals both to the first segment 210a and to the second segment 210b of the optical ring.

The inventive configuration of the multiplexing unit 308 advantageously enables to provide a 1+1 type group protection scheme for upstream data transmission from the remote node RNb to the OLT 100, wherein data is transmitted to said OLT 100 on both segments 210a, 210b. Thus, the remote node RNb can be designed as a completely passive device, while at the same time advantageously enabling a protection mechanism.

As already mentioned above, the OLT 100 comprises control means 140 that are configured to determine whether data to be received from said optical network 200, particularly from said remote node RNb, is to be received via said first port 110a or via said second port 110b. Depending on such determination, the control means 140 control switching means 141a via a control line 141 so as to choose the segment 210a, 210b to receive data from.

Furthermore, the control means 140 comprise light detecting means 142 to determine a loss of light, LoL, condition of a specific segment 210a, 210b, i.e. the absence of optical transmission power incident to one of the OLT's ports 110a, 110b associated with said specific segment 210a, 210b.

The control means 140 may conclude that there is an error condition such as a broken fiber within a segment. In response to such error condition, the control means 140 may choose the respective port 110a, 110b of the primary optical interface 110 to use for future downstream data transmissions to avoid transmitting data via said possibly broken fiber or ring segment, respectively.

For this purpose, the control means 140 control switching means 141b via a control line 141 or a separate control line (not shown) accordingly.

The OLT 100 preferably comprises one dedicated set of the exemplary depicted components 140, 141, 141a, 141b, 142 per remote node, from which data is to be received by said OLT 100. Of course, the control means 140 of the respective sets may share common resources such as processing capabilities of a common processor, memory means, and the like.

According to a further advantageous embodiment of the present invention, said OLT 100 comprises a booster amplifier 152b for amplifying transmission data that is provided by the transmission array 150b and Band A multiplexing means 151b.

According to a further advantageous embodiment of the present invention, said OLT 100 comprises a preamplifier 152a for pre-amplifying received data. The pre-amplified received data is forwarded to Band B demultiplexing means 151a and finally to a receiving array 150a.

Preferably, said optical fiber link 210 and said further optical fiber links 220a, 220b, 220c, 220d, 220e, 220f are at least partly integrated into the same fiber optic cable 205, cf. FIG. 5a.

FIG. 5a depicts a cross-section of a section of the fiber optic cable 205 between the OLT 100 and the remote node RN1 of FIG. 3. Advantageously, all single optical fibers 210', 220a', 220e' associated with the respective fiber links 210, 220a, 220e are integrated into the fiber optic cable 205.

FIG. 5b depicts a cross-section of a section of the fiber optic cable 205 between the remote node RN1 and the remote node RNa of FIG. 3. Advantageously, still all single optical fibers 210', 220a', 220e' associated with the respective fiber links 210, 220a, 220e are integrated into the fiber optic cable 205.

According to FIG. 5c, which depicts a cross-section of a section of the fiber optic cable 205 between the remote node RNa and the remote node RNb of FIG. 3, only two optical fibers 210', 220e' associated with the respective fiber links 210, 220e are integrated into the fiber optic cable 205. This is because the further optical fiber 220a' is connected to a coupler of remote node RNa which is configured to couple pump power from said fiber link 220e to the optical ring 210. Thus, the corresponding optical fiber 220e' ends within the coupler of remote node RNa.

FIG. 4 depicts a schematic block diagram of a fourth embodiment of the inventive OLT 100 and the inventive optical network 200.

The remote nodes RNk, RNn are supplied with pump power from the pump light sources 130a, 130b as already explained above. The remote nodes RNk, RNn also comprise couplers 302 for injecting the received pump power to the optical ring 210 and local EDFAs 305.

In contrast to the further remote nodes RNa, RNk, RNn, RNr, which are passive devices in that they cannot provide optical pump power, the remote node 300' presently comprises integrated pump light sources 330a, 330b for supplying remote nodes RNa, RNr with pump power via the secondary optical interface 320a, 320b, which is comparable regarding its structure and function to the secondary optical interface 120a, 120b of OLT 100.

The primary optical interface 310 of remote node 300' is connected to the multiplexing unit 308 as already explained with reference to FIG. 3.

The configuration depicted by FIG. 4 advantageously enables to provide pump power via corresponding fiber links 220a, 220b, 220g, 220h to various remote nodes and comprises a high degree of robustness against failures concerning only one pump light source. This configuration may advantageously be used for handling non-exclusively hubbed traffic, to provide dual-hubbed optical rings, i.e. to implement dual-homing concepts, and the like.

The inventive principle advantageously enables to provide pump power throughout the whole optical network 200 thus achieving true scalability of WDM-PONs to ring lengths of at least 100 kilometers and an overall number of remote nodes that is primarily limited by the available pump infrastructure 130a, 220a (FIG. 1).

At the same time, the inventive optical network 200 offers protection, particularly sub-band protection regarding WDM groups, between the OLT 100 and the remote nodes RN1, RN2, . . . .

ONU operation within the inventive optical network 200 is preferably based on demultiplexing of respective WDM groups within the remote nodes RN1, RN2, . . . and, if necessary, time division multiplexing, TDM, schemes.

The inventive approach is particularly advantageous for use in DWDM-based PONs due to the EDF-based amplification. Additionally, Raman amplifiers may be provided to extend the inventive principle to further WDM schemes or band ranges, respectively.

Further, the inventive protection schemes explained above do not require dedicated wavelength ranges for protection, so that all available wavelengths may be employed for transmitting payload.

The invention claimed is:

1. Optical network comprising a first network element, particularly optical line terminal (OLT), or remote node (RN), for transmitting and/or receiving data via the optical network that comprises at least one first optical fiber link, wherein said first optical network element has a primary optical interface configured to be connected with said first optical fiber link to transmit and/or receive data to/from said optical network, characterized by at least one secondary optical interface configured to provide optical pump power to at least one second network element via a second optical fiber link;
   wherein said secondary optical interface is configured to receive optical pump power from said second optical fiber link and to couple said received optical pump power to said first optical fiber link.

2. Optical network element according to claim 1, characterized by at least one pump light source configured to supply said secondary optical interface with optical pump power.

3. Optical network element according to claim 1, characterized by at least one pump light source configured to supply said primary optical interface with optical pump power.

4. Optical network element according to claim 2, characterized in that said pump light sources are configured to supply optical pump power having a plurality of different wavelengths.

5. Optical network element according to claim 1, characterized in that said primary optical interface comprises a first port for coupling the first optical network element to a first segment of said first optical fiber link and a second port for coupling the optical network element to a second segment of said first optical fiber link.

6. Optical network element according to claim 5, characterized by being configured to determine whether data to be transmitted to said optical network is to be transmitted via said first port or via said second port.

7. Optical network element according to claim 5, characterized by being configured to determine whether data to be received from said optical network is to be received via said first port or via said second port.

8. Optical network element according to claim 5, characterized by control means configured to selectively couple at least one of said ports of said primary optical interface with receiving means or transmitting means.

9. Optical network comprising a first network element, particularly optical line terminal (OLT), or remote node (RN), for transmitting and/or receiving data via the optical network that comprises at least one first optical fiber link, wherein said first optical network element has a primary optical interface configured to be connected with said first optical fiber link to transmit and/or receive data to/from said optical network, characterized by at least one secondary optical interface configured to provide optical pump power to at least one second network element via a second optical fiber link;
   wherein said optical fiber link forms a ring topology, wherein a first segment of said first optical fiber link is coupled to a first port of said primary optical interface of said first network element, wherein a second segment of said first optical fiber link is coupled to a second port of said primary optical interface of said first network element, wherein said optical network comprises a plurality of remote nodes coupled to said first optical fiber link between said first and second ports, characterized the second optical fiber link connecting said secondary optical interface of said first network element with at least one of said remote nodes for transmitting optical pump power from said first network element to said remote node.

10. Optical network according to claim 9, characterized in that said at least one second optical fiber link directly connects said secondary optical interface of said first network element with the n-th remote node of said ring topology downstream and/or upstream of said first network element, wherein n is equal to or greater than 2, preferably equal to or greater than 4.

11. Optical network according to claim 1, characterized in that said first optical fiber link comprises a single optical fiber for transmitting data.

12. Optical network according to claim 9, characterized in that said first optical fiber link and said second optical fiber link are at least partly integrated into the same fiber optic cable.

13. Optical network according to claim 1, characterized in that the first and second network elements according to claim 1, are configured as optical line termination (OLT), and are connected to said first optical fiber link.

14. A method of operating an optical network comprising at least one first optical fiber link and at least one first network element, wherein said first optical fiber link forms a ring topology, wherein a first segment of said optical fiber link is coupled to a first port of a primary optical interface of said first network element, wherein a second segment of said optical fiber link is coupled to a second port of said primary optical interface of said first network element, wherein said optical network comprises a plurality of remote nodes coupled to said first optical fiber link between said first and second ports, said method comprising a step of transmitting optical pump power directly from said first network element to said remote node by means of at least one second optical fiber link that connects said secondary optical interface of said first network element with at least one of said remote nodes;
   wherein the optical pump power is transmitted directly from said first network element to the plurality of said remote nodes via respective second optical fiber links, wherein the optical pump power transmitted via said second optical fiber links is coupled into said first optical fiber link at every n-th remote node, wherein n is equal to or greater than 2, preferably equal to or greater than 4.

* * * * *